Sept. 6, 1955        D. H. GROGAN              2,717,137
                  COTTON PICKING MACHINE
Filed May 19, 1950                         3 Sheets-Sheet 1
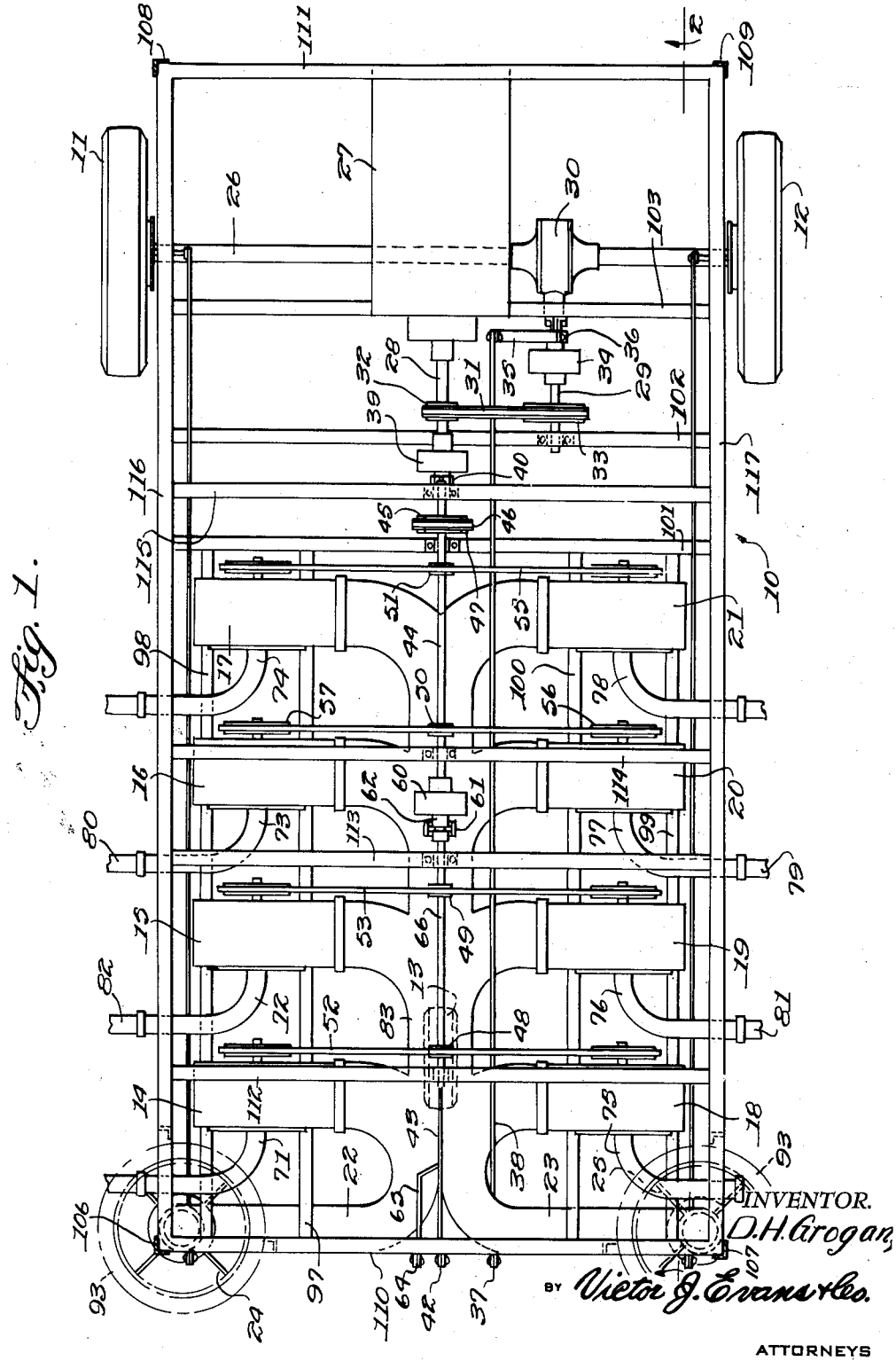

Sept. 6, 1955 D. H. GROGAN 2,717,137
COTTON PICKING MACHINE
Filed May 19, 1950 3 Sheets-Sheet 2
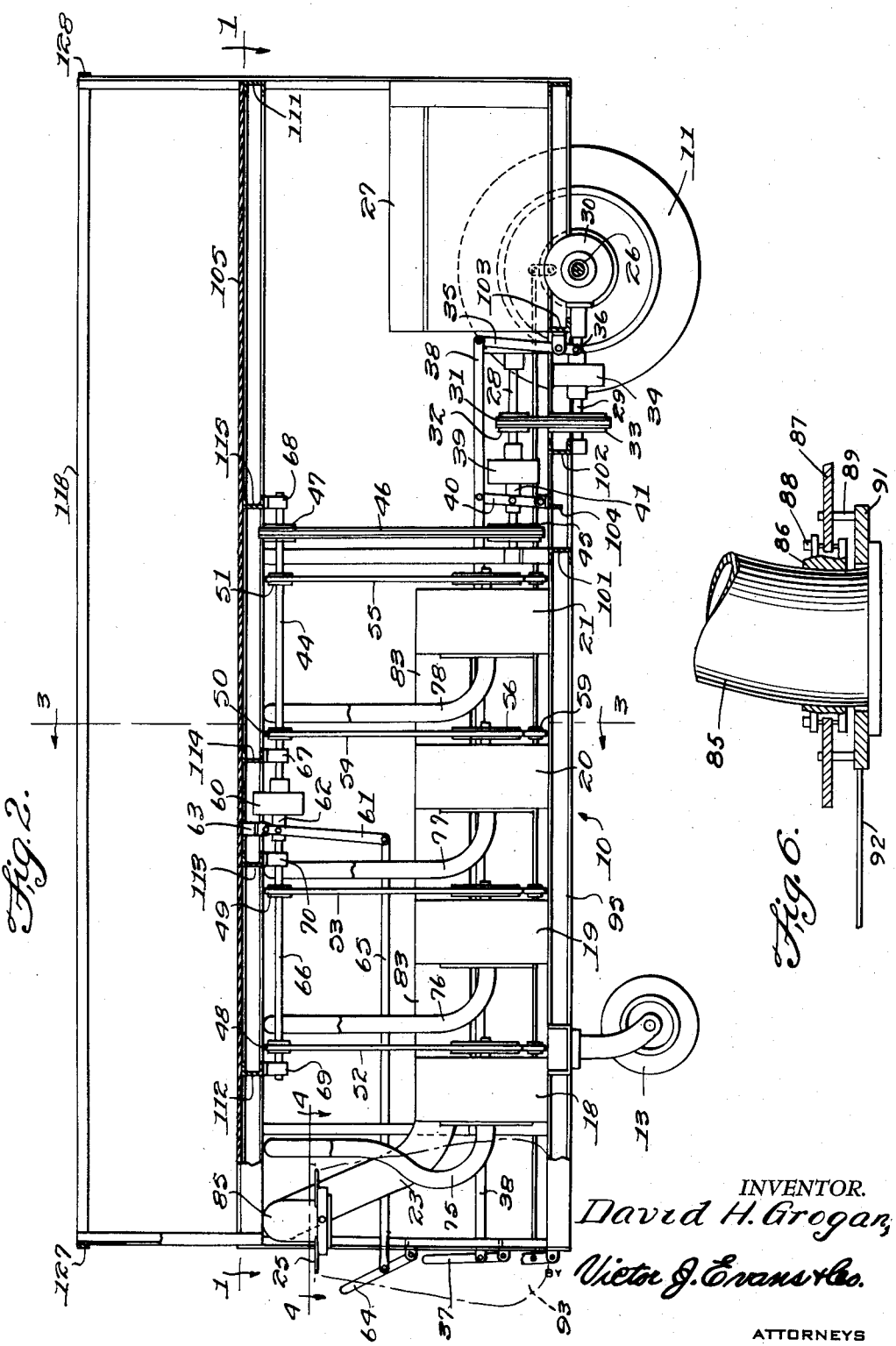
INVENTOR.
David H. Grogan,
BY Victor J. Evans & Co.
ATTORNEYS

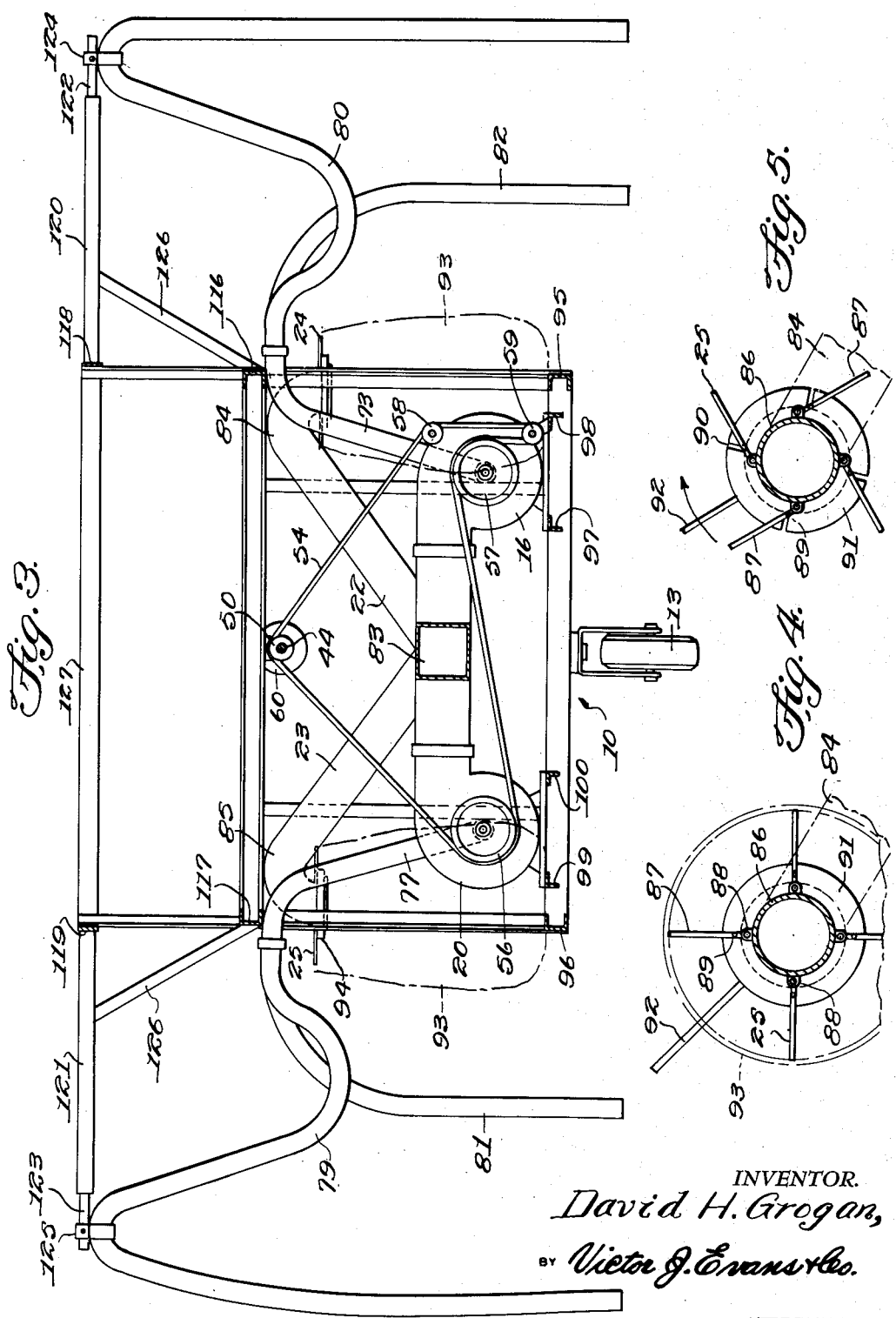

United States Patent Office 2,717,137
Patented Sept. 6, 1955

2,717,137

COTTON PICKING MACHINE

David H. Grogan, Montezuma, Ga.

Application May 19, 1950, Serial No. 162,996

1 Claim. (Cl. 248—99)

This invention relates to cotton picking machines of the vacuum or suction actuated type, and in particular a frame mounted on wheels and having a plurality of blowers mounted thereon with individual flexible suction tubes extended from each blower and with the blowers discharging into common ducts for blowing the cotton into bags or baskets suspended from the machine.

The purpose of this invention is to provide a cotton picking machine by which a plurality of rows of cotton may be picked with the machine traveling continuously over the rows of cotton.

Various devices have been provided for mechanically picking cotton but the suction method has many advantages and is not used because it is difficult to mechanically position ends of suction nozzles over the cotton boll. With this thought in mind this invention contemplates a cotton picker having rows of blowers mounted on a common frame with flexible suction hose extended from the blowers to positions from which operators may readily apply nozzles at the ends thereof to the cotton on the plant.

The object of this invention is, therefore to provide means for constructing a cotton picker of the gang type wherein a plurality of operators follow each row and wherein the suction tubes of the picker extend laterally to positions corresponding with a plurality of rows.

Another object of the invention is to provide a cotton picking machine of the suction type that is formed with blowers and other equipment that is found on the market and that may be used without changing the design or construction thereof.

A further object of the invention is to provide a multiple cotton picking machine that operates by vacuum or suction, which is of a simple and economical construction.

With these and other objects and advantages in view the invention embodies a horizontally disposed platform mounted on wheels with batteries of blowers on each side of the platform with bagging means at the end of the platform and with a superstructure having transversely telescoping beams for supporting suction tubes that may be suspended in positions corresponding with rows of cotton.

Other features and advantages of the invention will appear from the following description taken in connection with the drawings wherein:

Figure 1 is a plan view of the cotton picking machine taken on line 1—1 of Figure 2.

Figure 2 is a vertical longitudinal section through the machine being taken on line 2—2 of Figure 1.

Figure 3 is a cross section through the machine taken on line 3—3 of Figure 2.

Figure 4 is a sectional plan taken on line 4—4 of Figure 2 showing a bag expanding and supporting element.

Figure 5 is a detail illustrating the spreading action of the expanding device for gripping the upper open end of a bag.

Figure 6 is a detail showing a side elevational view of one of the bag holding devices shown in Figures 4 and 5.

Referring now to the drawings wherein like reference characters denote corresponding parts the cotton picking machine of this invention includes the horizontally disposed plaform or frame 10 mouted on wheels 11 and 12 at the front and a caster 13 at the rear with blowers 14, 15, 16 and 17 on one side and 18, 19 20 and 21 on the other, and the blowers are connected by ducts 22 and 23 on the ends of which bag spreading arms 24 and 25, respectively are positioned.

The wheels 11 and 12 at the forward end of the frame are mounted on an axle 26 and these wheels are driven by a motor 27 through a drive shaft 28, a jack shaft 29 and a differential 30. The drive shaft 28 drives the jack shaft 29 with a belt 31, one end of which is positioned on a pulley 32 on the shaft 28, and the other on a pulley 33 on the jack shaft 29. A clutch 34 is provided in the jack shaft 29 and the clutch is actuated by a clutch lever 35 through a sliding collar 36 with the lever 35 controlled by a hand lever 37 through a rod 38.

A clutch 39 is also provided on the drive shaft 28 and this clutch is actuated by a clutch lever 40 through a clutch collar 41. The clutch lever 40 is controlled from a hand lever 42 by a rod 43.

The blowers are driven from a countershaft 44 which is driven from the drive shaft 28 by a pulley 45 through a belt 46 which extends around a pulley 47 on the countershaft and the countershaft is provided with a pulley 48 for the blowers 14 and 18, a pulley 49 for the blowers 15 and 19, a pulley 50 for the blowers 16 and 20 and the pulley 51 for the blowers 17 and 21. The blowers 14 and 18 are driven by a belt 52, the blowers 15 and 19 by a belt 53, the blowers 16 and 20 by a belt 54, and the blowers 17 and 21 by a belt 55.

Each of the belts 52, 53, 54, and 55 is trained over pulleys, as illustrated in Figure 3 wherein the belt 52, which is driven by a pulley 48 on the shaft 44 is trained around a pulley 56 on the blower 14, a pulley 57 on the blower 18, an idler 58, and a take-up pulley 59.

The shaft 44 is provided with a clutch 60 which is actuated by a clutch lever 61 through a clutch collar 62 and the lever, which is pivotally mounted on a bearing 63 is actuated by a hand lever 64 through a rod 65. By this means the forward section of the countershaft which is indicated by the numeral 44 may be disconnected from the rear section 66 so that only the back, or the blowers 16, 17, 20 and 21 will be operated. The countershaft 44 is journaled in bearings 67 and 68 and the section 66 in bearings 69 and 70.

Each blower is provided with a suction connection with connections 71, 72, 73 and 74 extended from the blowers 14, 15, 16 and 17, and connections 75, 76, 77 and 78 from the blowers 18, 19, 20 and 21, respectively.

As illustrated in Figures 3 suction tubes 79 and 80 extend from the ends of the flexible hose connections 73 and 77, respectively, and the flexible hose connections 81 and 82, the length of which is less than that of the sections 79 and 80 extend from alternate blowers with the flexible hose connections extended from the sections similar to the sections 72 and 76, respectively.

The blowers discharge through arcuate connecting sections to a common header 83 which is divided at the rear into the branch connections 22 and 23 and the connections 22 and 23 extend to the bag supporting elements 24 and 25 which are illustrated in detail in Figures 4 and 5.

The branch connections 22 and 23 slope upwardly and bend over through arcuate sections 84 and 85 and the sections 84, as an illustration, extends through a band 86 having bearings 87 thereon in which the arms 25 are pivotally mounted by pins 88, as shown in Figure 4.

The lower edges of the arms 87 are provided with downwardly extended pins 89 that extend into slots 90 in a flange 91 and the flange is provided with a handle 92. By this means the arms 87 are collapsed to the positions shown in Figure 5 and when a bag, as indicated by the dotted lines 93 is placed over the ends of the arms the arms are expanded by the handle 92 to the position shown in Figure 4.

A similar bag supporting element, as indicated by the numeral 94 is carried by the lower end of the section 85 of the branch 23.

The platform 10 of the cotton picker is formed with side channels 95 and 96, connected by cross channels 97 and 98 at the ends and the blowers on one side are mounted on angles 97 and 98, with the blowers on the opposite side mounted on similar angles 99 and 100. The platform is also provided with cross channels 101, 102, and 103 and an angle 104 is provided for supporting the clutch lever 40.

The chassis or platform of the cotton picker is also provided with an upper panel 105 which is supported by posts 106 and 107 at one end and 108 and 109 at the other and at this level cross channels 110 and 111 are provided at the end with intermediate channels 112, 113, 114 and 115. The intermediate cross channels are supported in side channels 116 and 117.

The picker frame is also provided with a superstructure formed with side rails 118 and 119 carried by the upper ends of the posts at the corners of the platform and telescoping arms 120 and 121 with sliding bars 122 and 123 therein, respectively extend outwardly from the rails 118 and 119 to support the long flexible picking hose connections 79 and 80. The hose connections are supported by clamps 124 and 125 and the telescoping arms may be provided with diagonal braces 126. The rails 118 and 119 are connected by cross rails 127 and 128 at the ends.

With the parts arranged in this manner the cotton picker is driven across the field with the flexible connections 79, 80, 81, 82 positioned to travel over rows of cotton and with an operator at the end of each hose connection cotton bolls are separated from the plants and conveyed through the blowers, header 83 and connections 22 and 23 through which they are blown into sacks as indicated by the numeral 93.

The clutch 60 provides means for separating parts of the blowers so that all of the blowers may be used, or only two sets of blowers may be used at one time as may be desired.

It will be understood that modifications may be made in the design and arrangement of the parts without departing from the spirit of the invention.

What is claimed is:

A bag holder for a cotton picking machine having discharging ducts extended from blowers comprising a band having circumferentially spaced bearings thereon, arms pivotally mounted in the bearings of the band, said arms having pins extended downwardly therefrom, a flange including a handle and said flange having radially disposed spaced apart slots therein, said flange being rotatably mounted contiguous to an end of said band, the pins of the arms being positioned in the slots of the flange whereby by turning the flange in one direction by means of the handle, the arms are collapsed to facilitate placing a bag thereon and with the flange turned in the opposite direction the arms are extended to grip the bag for retaining the bag in position for receiving cotton from the ducts.

References Cited in the file of this patent
UNITED STATES PATENTS

| Number | Name | Date |
| --- | --- | --- |
| 558,531 | Tarr | Apr. 21, 1896 |
| 773,357 | Webb | Oct. 25, 1904 |
| 1,005,289 | O'Neil | Oct. 10, 1911 |
| 1,032,115 | Cook | July 9, 1912 |
| 1,498,612 | Collingwood | June 24, 1924 |
| 1,688,312 | Onsrud | Oct. 16, 1928 |
| 1,887,831 | Willett et al. | Nov. 15, 1932 |
| 1,971,349 | Koon | Aug. 28, 1934 |
| 2,241,423 | Rust | May 13, 1941 |
| 2,632,613 | Hack | Mar. 24, 1953 |